United States Patent [19]
Saltin

[11] Patent Number: 5,104,310
[45] Date of Patent: Apr. 14, 1992

[54] METHOD FOR REDUCING THE FLAME TEMPERATURE OF A BURNER AND BURNER INTENDED THEREFOR

[75] Inventor: Lars Saltin, Västerås, Sweden
[73] Assignee: AGA Aktiebolag, Lidingo, Sweden
[21] Appl. No.: 719,655
[22] Filed: Jun. 24, 1991

Related U.S. Application Data
[63] Continuation of Ser. No. 346,838, filed as PCT/SE87/00515, Nov. 4, 1987, abandoned.

[30] Foreign Application Priority Data
Nov. 24, 1986 [SE] Sweden ................ 8605015

[51] Int. Cl.⁵ ........................... F23D 14/22
[52] U.S. Cl. ........................ 431/10; 431/9; 431/160; 431/115; 431/350; 431/353
[58] Field of Search ............... 431/8, 9, 10, 115, 116, 431/160, 350, 357, 353

[56] References Cited
U.S. PATENT DOCUMENTS

| | | | |
|---|---|---|---|
| 3,663,153 | 5/1972 | Bagge et al. | 431/351 |
| 3,676,060 | 7/1972 | Bedetti | 431/8 X |
| 3,685,740 | 8/1972 | Shepherd | 431/351 X |
| 3,817,685 | 6/1974 | Joannes | |
| 4,181,491 | 1/1980 | Hovis | 431/190 |
| 4,797,087 | 1/1989 | Gitman | 431/10 |

FOREIGN PATENT DOCUMENTS

| | | | |
|---|---|---|---|
| 1143117 | 2/1969 | United Kingdom | 431/350 |
| 1502413 | 3/1978 | United Kingdom | 431/8 |
| 2048456 | 12/1980 | United Kingdom | 431/10 |
| 2146113 | 4/1985 | United Kingdom | 431/10 |

Primary Examiner—Carl D. Price
Attorney, Agent, or Firm—Calfee, Halter & Griswold

[57] ABSTRACT

A method for reducing the flame temperature of an oxy-fuel burner, such a burner comprising a central oxygen nozzle at least one fuel nozzle radially spaced from the central oxygen nozzle, and at least one peripheral oxygen nozzle at greater radial distance from the central oxygen nozzle than the fuel nozzle, all nozzles being at least substantially parallel, a casing surrounding the nozzles and whose forward end lies in a plane at right angles to the longitudinal axis of the burner, and whose rear portion defines an oxygen chamber, and means for the supply of oxygen-containing gas and fuel, respectively, to the nozzles. The peripheral oxygen nozzle is in the form of a Laval nozzle or, if it is an annular nozzle, is of the same cross-sectional variation as the Laval nozzle throughout its entire length. The major fraction of the volume of oxygen requisite for combustion is caused to pass at great speed through at least one oxygen nozzle disposed about the burner nozzle and thereby aspirate ambient atmosphere which is at a lower temperature than the flame, before the oxygen from the oxygen nozzle reacts in the flame.

9 Claims, 2 Drawing Sheets

METHOD FOR REDUCING THE FLAME TEMPERATURE OF A BURNER AND BURNER INTENDED THEREFOR

"This is a continuation of copending application(s) Ser. No. 07/346,838 filed on Apr. 12, 1989, based upon International Application PCT/SE87/00515 filed on Nov. 4, 1987, now abandoned and which designated the U.S.".

TECHNICAL FIELD

The present invention relates to a burner and a method for reducing the flame temperature of the burner, the burner comprising a central oxygen nozzle, at least one fuel nozzle disposed outside the oxygen nozzle, and at least one peripheral oxygen nozzle disposed at greater radial spacing from the central oxygen nozzle than the fuel nozzle, all nozzles being at least substantially parallel.

BACKGROUND ART

In the employment of burners driven by a fuel and pure oxygen, so-called oxy-fuel burners, a higher flame temperature and smaller volumes of exhaust gas will be obtained than in burners operated using a fuel and air or oxygen-enriched air. High flame temperatures are a primary objective in high temperature processes, for instance in melting steel in light arc furnaces, or in order to achieve high thermal transmission, i.e. to increase output capacity because of more rapid heating rise times. Small volumes of exhaust gases give correspondingly small thermal losses, since these are a function of the volume of exhaust gas and the temperature of the exhaust gas. A burner which is operated using oxygen gives a flame temperature of approximately 2,800° C. and a volume of exhaust gas of approximately 3 Nm$^3$/kg of fuel, while a burner operating with air gives a flame temperature of approximately 1,900° C. and a volume of exhaust gas of approximately 12 Nm$^3$/kg of fuel using, for example, heating oil as fuel. Hence, oxy-fuel burners have a high degree of thermal efficiency.

However, in certain physical applications it may be difficult to extract the full benefit of the high flame temperature of oxy-fuel burners, for example in heating furnaces where the high flame temperature may result in considerable variations and uneven heating of matter because of locally extreme heating.

One object of the present invention is, hence, to realize a method for reducing the flame temperature of an oxy-fuel burner without thereby occasioning considerable increase in the volume of exhaust gas produced.

A further object of the present invention is to device an oxy-fuel burner which, in operation, gives a lower flame temperature than standard oxy-fuel burners.

DISCLOSURE OF THE PRESENT INVENTION

The object of reducing the flame temperature of an oxy-fuel burner will be attained according to the present invention by means of a method in which use is made of a burner with a central, first oxygen nozzle, with at least one fuel nozzle radially disposed outside the first oxygen nozzle, and at least one second, peripheral oxygen nozzle disposed radially outside and at greater spaced-apart relationship from the first, central oxygen nozzle than is the fuel nozzle. The method according to the present invention is characterized in that the major fraction of the oxygen-containing gas required for combustion of fuel is caused to pass at high speed through the peripheral oxygen nozzle and thereby entrain ambient atmosphere which is at a lower temperature than the flame, before the oxygen reacts in the flame.

According to one particularly preferred embodiment of the present invention, the major fraction of the oxygen is caused to flow through a plurality of peripheral oxygen nozzles which converging-diverging nozzles, or so called Laval nozzles, or an annular, peripheral oxygen nozzle which has been designed in such a manner that gas flowing therethrough will obtain the same flow profile as on passage through a Laval nozzle. According to a further particularly preferred embodiment of the present invention, the oxygen flowing through the above-mentioned nozzles or nozzle is caused to pass therethrough at a speed which exceeds the speed of sound for oxygen. According to the invention, it is to be preferred that the greater fraction of the volume of oxygen is between 60 and 90 percent, most appropriately between 75 and 85 percent of the total volume of oxygen fed to the burner.

The burner according to the present invention comprises a central oxygen nozzle, at least one fuel nozzle radially spaced from the central oxygen nozzle, and at least one peripheral oxygen nozzle disposed at a greater radial distance from the central oxygen nozzle than the fuel nozzle, all nozzles being at least substantially parallel. The burner according to the present invention further includes a burner casing and means for the supply of oxygen-containing gas and fuel, respectively, to the nozzles. The burner according to the present invention is characterized in that the peripheral oxygen nozzle is designed as a Laval nozzle. Preferably, there are provided, in one burner, a plurality of peripheral oxygen nozzles which are all designed as Laval nozzles and are preferably disposed symmetrically in a ring. This entails that the central axes of the peripheral oxygen nozzles are located in a ring which surrounds the central oxygen nozzle. According to a further embodiment of the present invention, the peripheral nozzle is an annular nozzle which is disposed concentrically with the central oxygen nozzle. In order to impart to the gas flowing through such an annular nozzle as high speed as possible, the cross-sectional area of the nozzle is designed in a manner which corresponds to that of a Laval nozzle.

The plane through the exit aperture of the annular, peripheral oxygen nozzle, or the exit apertures of the nozzles disposed in a ring may lie in the same plane as that plane in which the exit aperture of the central oxygen nozzle lies, or in a plane parallel therewith. Normally, the plane of the exit aperture of the fuel nozzle, or the exit apertures of the fuel nozzles, coincides with the plane of the exit aperture of the central oxygen nozzle.

The nature of the present invention and its aspects, further characterizing features and embodiments, will be more readily understood from the following brief description of the accompanying Drawings, and discussion of a number of embodiments of the present invention, relating thereto.

BRIEF DESCRIPTION OF THE ACCOMPANYING DRAWINGS

DESCRIPTION OF PREFERRED EMBODIMENTS

Figure 1:
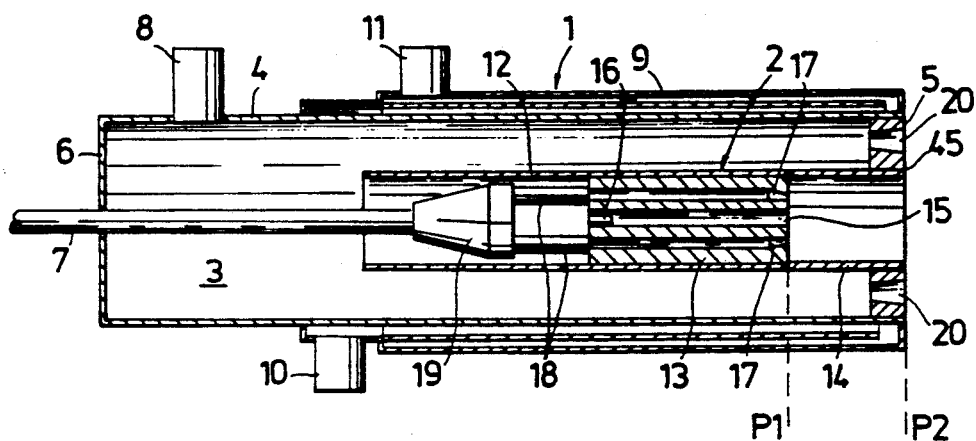
FIG. 1 is a schematic section through one preferred embodiment of the longitudinal axis of the burner according to the present invention.

Referring to the drawings, the burner of FIG. 1 displays a central body 2 and an oxygen chamber 3 disposed outside the central body and provided with a cylindrical casing 4 concentric with the central body 2. The central body 2 includes a tubular body 12 which, at its forward end, merges into an end piece 13. Ahead of the end piece, there is disposed a tubular extension 14 of the same outer diameter as the tubular body 12 and the end piece 13. The end piece 13 includes a central oxygen channel 15 which is provided with a throttle 16 and constitutes a first oxygen nozzle. The end piece 13 further includes a number, for example six, of nozzles 17 for fuel which are disposed symmetrically in an annulus concentrically surrounding the first central oxygen nozzle 15. The tubular extension 14 is of such inner diameter as to lie radially outside the fuel nozzles 17. The fuel nozzles are each connected by their conduit 18 to a branch conduit 19 which, in turn, is connected to a fuel conduit 7. The fuel conduit departs from the burner through a rear wall 6 in the burner.

The oxygen chamber 3 is defined not only by the casing 4, but also by a rear wall 6 and a front wall 5 with a central aperture 45 connecting the casing 4 to the cylindrical circumferential surface of the central opening 2, i.e. the tubular extension 14, the center body constituting a part of the forward defining demarcation of the oxygen chamber 3. The tubular extension 14 terminates flush with the forward edge of the burner, but may also extend a further distance beyond the wall 5. The oxygen chamber 3 is proved with an inlet 8 for oxygen. The forward region of the casing 4 is designed as a cooling jacket 9 with an inlet 10 for coolant liquid, which departs from the cooling jacket 9 through an outlet 11. The forward, annular wall 5 of the oxygen chamber is provided with apertures 20 whose centers lie symmetrically in an annulus concentrically with the geometric axis of the oxygen chamber 3. These apertures constitute the peripheral oxygen nozzles of the burner. The apertures 20 are preferably designed as Laval nozzles. The aperture 20 may also consist of an annular gap. This annular gap may possibly be designed in two or more segments. It is also to be preferred in this embodiment that the nozzle be of such design as to realize a flow profile which at least substantially corresponds to that obtained in a Laval nozzle.

In the burner 1 according to FIG. 1, the exit apertures of the peripheral oxygen nozzles 20 are located in the same plane P2 as the forward edge of the casing and the front side of the wall 5. The exit apertures of the central oxygen nozzle 15 and the fuel nozzle 17 are located in the front edge of the center body 2 and lie in a second plane P1 which is parallel to P2.

Figure 2:
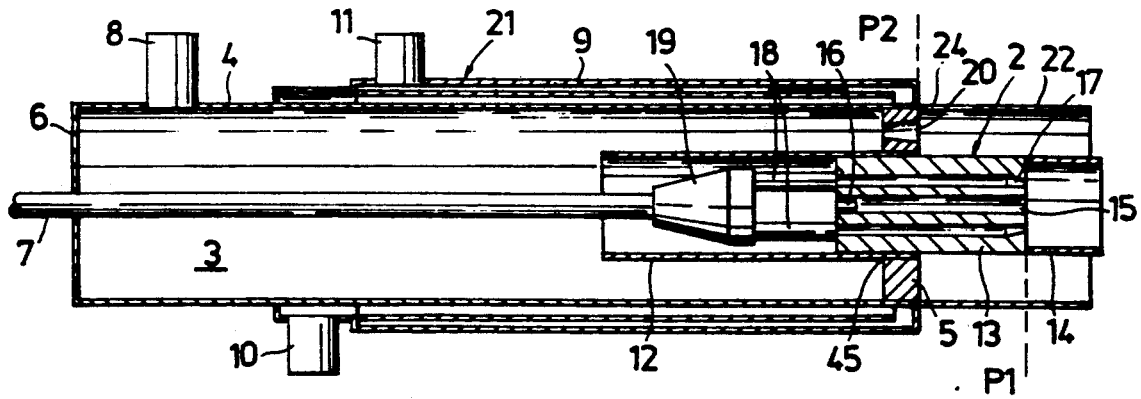
FIG. 2 is a schematic section through a second embodiment corresponding to that of FIG. 1.

The burner of FIG. 2 is similar to that of FIG. 1 and corresponding details in both of the burners have been given the same reference numerals. The burner 21 differs from the burner 1 of FIG. 1 substantially in that the center body 2 is displaced forwardly in relation to the front wall 5 of the burner. In this circumstance, the front wall 5 sealingly surrounds the end piece 13 of the central body 2. The burner 21 is provided with a tubular member 22 which is an extension of the casing 4 in a forward direction or is disposed in the front wall 5. The inner diameter of the member 22 is the same as, or slightly less than that of the oxygen chamber. The burner 21 is provided with an uneven number of diverging oxygen nozzles 20 in the wall 5. The tubular member 22 is provided with apertures 24 immediately ahead of—and radially outside the nozzles 20—in relation to the axis of the burner. As will be apparent from FIG. 2, the forward edge of the member 22 may be located flush with, may be shorter than or may extend beyond the forward edge of the extension 14.

Figure 3:
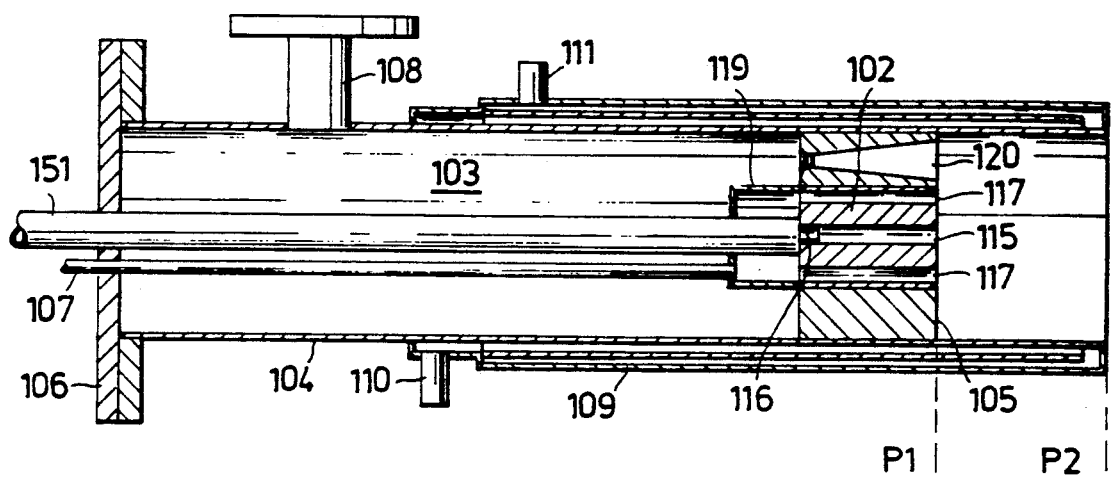
FIG. 3 is a schematic section through the longitudinal axis of the burner according to yet another embodiment of the present invention.

The burner according to FIG. 3 displays a center body 102 and a surrounding oxygen chamber 103 with a cylindrical casing 104 concentric with the center body 102. The center body 102 includes a central oxygen passage 115 which is provided with a throttle 116 and constitutes a first oxygen nozzle. The center body 102 further includes a number, for example six, of nozzles 117 for fuel which are disposed symmetrically in a ring which concentrically surrounds the first central oxygen nozzle 115. Behind the center body 102 (to the left in FIG. 3), there is disposed a fuel chamber 119 for distribution of fuel to the fuel nozzles 117. A conduit 107 is connected to the fuel chamber 119 and passes through the oxygen chamber 103, departing from the burner through a rear defining wall 106. This conduit also passes through the fuel chamber 119 and is connected through the central oxygen nozzle 115.

The oxygen chamber 103 is defined, not only by the casing 104, but also by the rear wall 106 and a forward wall 105 which connects the casing 104 to the cylindrical circumferential surface of the center body 102, the center body constituting a part of the forward bounding definition of the oxygen chamber 103. The oxygen chamber 103 is provided with an inlet 108 for oxygen. The forward portion of the casing 104 is designed as a cooling jacket 109 with an inlet 110 for coolant liquid, which departs from the cooling jacket 109 through an outlet 111. The forward, annular wall 105 of the oxygen chamber is provided with apertures 120 whose center line lies symmetrically in a ring concentrically with the geometric axis of the oxygen chamber 103. These apertures constitute the peripheral oxygen nozzles of the burner. The position of the center body 102 along the longitudinal axis of the burner need not critically be that shown on the drawing, the center body 102 may instead be displaced forwardly or rearwardly in the direction of the axis of the burner.

The conduit 151 for oxygen-containing gas may be connected to the same source of gas as is the inlet 108 to the oxygen chamber. In this case, the throttle 116 is employed to regulate the volume of gas through the central oxygen nozzle 115. If the conduit 115 and the conduit 108 are connected to separate sources of oxygen-containing gas, the throttle 116 may be dispensed with. The flow through the nozzle 115 will then be regulated by other means which are obvious to persons skilled in the art.

According to a further embodiment of the present invention, the center body 102 displays a fistular extension in a direction towards the oxygen chamber 103, as designated 12 in FIG. 1. In this case, the conduit 151 for oxygen-containing gas has been removed. The conduit 107 for fuel may then be provided with a distributing nozzle (19 in FIG. 1) which is connected, by the intermediary of branch conduits (18 in FIG. 1) to the fuel nozzles 117. Oxygen-containing gas from the chamber 103 will then be distributed among the peripheral oxygen nozzles 102 and the central oxygen nozzle 115 fitted with the throttle 116.

Figure 4:
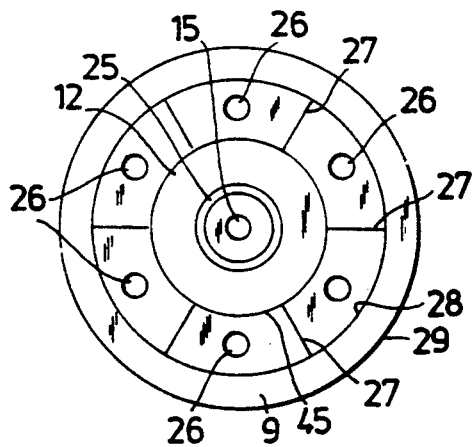
FIG. 4 schematically illustrates a front elevation of the burner according to yet a further embodiment.

FIG. 4 is a front elevation of a fourth embodiment of a burner according to the present invention, the inlets 8, 10 and the outlet 11 not being shown on the drawing. The central oxygen nozzle 15 defines the center body 2 both interiorly and exteriorly, and, a gap-like annular nozzle 25 for fuel is disposed outside this nozzle. Radially outside the center body in the front wall 5, there are disposed six further oxygen nozzles 26 which may preferably be in the form of a Laval nozzle. The outer and inner bounding surfaces of the cooling jacket 9 are designated 29 and 28, respectively. A partition 27 is disposed between each pair of adjacent oxygen nozzles 26, this partition departing from the wall 5 and preferably being rectangular in configuration. The partition 27 extends from the center aperture of the wall 5 to the casing 4 and, where applicable, between the center body 2 and the tubular member 22.

When the burner of FIG. 1 is put into use, fuel (which may be solid, liquid or gaseous) is fed through the conduit 7 and distributed in the branch 19 to the conduit 18 and is thence conveyed to and through the nozzles 17 spreading out, on departing from the nozzles 17, into an annular jet. In the case of slid fuel, this fuel is conveyed by means of a gas. The oxygen supplied through the inlet 8 to the oxygen chamber 3 ids divided into two flows. The one part flow enters into the rear region of the center body 2, the tubular body 12 and flows past the branch 19 entering the nozzle 15 by the intermediary of the throttle. The oxygen departs from the nozzle 15 as a jet which is concentrically surrounded by the annular fuel jet from the nozzles 17. The second part flow of oxygen flows into the annular space which is defined by the center body 2 and the casing 4, departs from the oxygen chamber 3 through the nozzles 20 in the wall 5 and then forms an annular jet parallel with the longitudinal axis of the burner. By adapting the size of the throttle 16 and the size of the peripheral oxygen nozzles 20, it is possible to regulate the size between the two oxygen part flows. The rate of passage through the nozzles depends essentially upon the design of the nozzles, since the pressure on the upstream side of the nozzles is high. By imparting high flow rate to the oxygen departing from the peripheral nozzles 20, ambient atmosphere, of low oxygen content outside the burner and cold in relation to the flame when the burner is ignited and operated, will be aspirated into the outer oxygen flow and thereby reduce the oxygen content and temperature in the peripheral second oxygen part flow. Since the peripheral oxygen flow is moving at a very high rate, often faster than the speed of sound in oxygen, a higher degree of admixture of surrounding ambient atmosphere will be obtained in this subflow, at the same time as a more parallel—i.e. less diverging oxygen jet is obtained. The distance from the plane P2 (i.e. the plane in which the peripheral oxygen nozzles lie) to the region of mixture of the fuel jet and the peripheral oxygen jet also increases with the increasing speed of the peripheral oxygen jet.

By lengthening the portion 14 in FIG. 1 such that is extends beyond the plane P2, it is possible to further displace the reaction of the peripheral oxygen and the fuel from the plane P2, since it is then possible to suppress the divergence of the fuel jet and since there is a partition between the above-disclosed jets.

If, in the burner according to FIG. 1, the fistular body 12 is extended such that it passes through the rear wall 6, it is possible to connect the central oxygen nozzle to an oxygen source at another pressure than that prevailing in the oxygen chamber 3. Hereby, it will be further possible, within predetermined limits, to vary the rate of the two flows of oxygen departing from the burner.

When the burner according to FIG. 2 is put into operation, the ambient atmosphere surrounding the burner is aspirated into the aperture 20 by the oxygen flow passing between the central body 2 and the fistular member 22. This will thereby create a mixture zone, in which the oxygen from the peripheral nozzles and the aspirated ambient atmosphere may be mixed before this mixture can come into contact with the fuel jets and react therewith.

This gas which flows through the oxygen nozzles need, naturally, not consist of 100 percent oxygen, but may, instead, consist of oxygen-enriched air with at least 50 percent oxygen.

The fuel nozzles and the peripheral oxygen nozzles may be parallel with the longitudinal axis of the burner and the central oxygen nozzle, but may, naturally, also be designed so as to impart a helical direction of movement to the fuel and the peripheral current of oxygen in relation to the longitudinal axis of the burner.

The designations oxygen nozzle and oxygen chamber are here intended to relate to nozzle and chamber, respectively, for oxygen-containing gas required for combustion of fuel.

I claim:

1. A method of reducing the flame temperature of a burner which includes a chamber for receiving oxygen-containing gas, a central oxygen nozzle in direct communication with said chamber, at least one fuel nozzle disposed outside the oxygen nozzle, and at least one peripheral oxygen nozzle disposed at greater radial distance from the central oxygen nozzle than the fuel nozzle, in which the major fraction of the oxygen-containing gas required for combustion of fuel, said gas containing at least fifty percent oxygen, is caused to pass through the peripheral oxygen nozzle at a rate of passage higher than the speed of sound in the oxygen-containing gas and thereby entrain ambient atmosphere which is at lower temperature than the flame with the oxygen-containing gas, before the oxygen-containing gas reacts in the flame.

2. The method as claimed in claim 1, characterized in that the oxygen-containing gas is pure oxygen.

3. A burner with a chamber for receiving oxygen-containing gas, a central oxygen nozzle in direct communication with said chamber, at least one fuel nozzle radially spaced from the central oxygen nozzle for carrying only fuel, and at least one peripheral oxygen nozzle at greater radial distance from the central oxygen nozzle than the fuel nozzle, all nozzles being at least substantially parallel to each other and to a longitudinal axis of said burner, a casing surrounding said nozzles whose forward end lies in a first plane perpendicular to said longitudinal axis of the burner, and whose rear region defines said chamber for receiving oxygen-containing gas, and exit apertures of each of said nozzles lie in a second plane perpendicular to said longitudinal axis of the burner and parallel to said first plane, and means for supplying oxygen-containing gas and fuel, respectively, to said nozzles, in which the peripheral oxygen nozzle is in the form of a converging-diverging nozzle, said means for supplying oxygen-containing gas and fuel, respectively, to said nozzles, and said exit apertures of all nozzles being substantially surrounded by said casing, which extends radially beyond the exit apertures of the nozzles, and includes a cooling jacket positioned adjacent said nozzles, wherein aid cooling jacket surrounds and forms a part of aid casing for receiving coolant material.

4. The burner as claimed in claim 3, in which the distance between the second plane and the first plane is at most 2d, d being the inner diameter of the casing.

5. The burner as claimed in claim 3, in which the central oxygen nozzle and the fuel nozzle are disposed in a center body and the peripheral oxygen nozzle is disposed in a wall radially outside the center body of a fistular extension thereof, and the exit apertures of the nozzles in the center body lie in the second plane at right angles to the longitudinal axis of the burner and parallel to the first plane through the discharge opening of the peripheral oxygen nozzle and the distance between the first and second planes is at most 2D, D being the outer diameter of the center body.

6. The burner as claimed in claim 5, in which the wall surrounds the center body, wherein the forward end of the center body is designed as a peripheral extension which projects ahead of and radially beyond the exit apertures of the nozzles in the center body.

7. A burner comprising a central oxygen nozzle, at least one fuel nozzle, radially spaced from the central oxygen nozzle, and at least one peripheral oxygen nozzle at greater radial distance from the central oxygen nozzle than the fuel nozzle, all nozzles being at least substantially parallel, a casing surrounding said nozzles and whose forward end lies in a plane at right angles to the longitudinal axis of the burner, and whose rear region defines an oxygen chamber, said central oxygen nozzle in direct communication with said oxygen chamber, means for supplying oxygen-containing gas and fuel, respectively, to said nozzles, and a portion of said means for supplying said nozzles within the burner being substantially parallel with said nozzles, and characterized in that the peripheral oxygen nozzle is in the form of a converging-diverging nozzle, said portion of said means for supplying oxygen-containing gas and fuel, respectively, to said nozzles, and said exit apertures of all nozzles, are substantially surrounded by the casing, which is radially beyond the exit apertures of the nozzles, and is designed as a cooling jacket, said central oxygen nozzle and the fuel nozzle being disposed in a center body and the peripheral oxygen nozzle is disposed in a wall radially outside the center body or a fistular extension thereof, and the exit apertures of the nozzles in the center body lie in the second plane at right angles to the longitudinal axis of the burner and parallel to the first plane through the discharge opening of the peripheral oxygen nozzle and that the distance between the first and second planes is at most 2D, D being the outer diameter of the center body, and a fistular member concentric with the center body and of greater diameter than the center body, said member being connected to the front wall or being an extension of the casing in a forward direction, and the peripheral oxygen nozzle discharges in the cylindrical space defined by the fistular member or in the compartment defined by he fistular member and the center body, and the fistular member is provided with at least one aperture adjacent the front wall.

8. A burner comprising a central oxygen nozzle, at least one fuel nozzle, radially spaced from the central oxygen nozzle, and at least one peripheral oxygen nozzle at greater radial distance from the central oxygen nozzle than the fuel nozzle, all nozzles being at least substantially parallel, a casing surrounding said nozzles and whose forward end lies in a plane at right angles to the longitudinal axis of the burner, and whose rear region defines an oxygen chamber, said central oxygen nozzle in direct communication with said oxygen chamber, means for supplying oxygen-containing gas and fuel, respectively, to said nozzles, and a portion of said means for supplying said nozzles within the burner being substantially parallel with said nozzles, and characterized in that the peripheral oxygen nozzle is in the form of an annular nozzle, said portion of said means for supplying oxygen-containing gas and fuel, respectively, to said nozzles, and said exit apertures of all nozzles, are substantially surrounded by the casing, which is radially beyond the exit apertures of the nozzles, and is designed as a cooling jacket, said central oxygen nozzle and the fuel nozzle being disposed in a center body and the peripheral oxygen nozzle is disposed in a wall radially outside the center body or a fistular extension thereof, and the exit apertures of the nozzles in the center body lie in the second plane at right angles to the longitudinal axis of the burner and parallel to the first plane through the discharge opening of the peripheral oxygen nozzle and that the distance between the first and second planes is at most 2D, D being the outer diameter of the center body, and a fistular member concentric with the center body and of greater diameter than the center body, said member being connected to the front wall or being an extension of the casing in a forward direction, and the peripheral oxygen nozzle discharges in the cylindrical space defined by the fistular member or in the compartment defined by the fistular member and the center body, and the fistular member is provided with at least one aperture adjacent the front wall.

9. A burner comprising
a chamber for receiving oxygen-containing gas,
a central oxygen nozzle positioned within said chamber and having a central longitudinal axis and an exit aperture,
at least one fuel nozzle for carrying only fuel positioned within said chamber radially spaced from said central oxygen nozzle and having a central longitudinal axis and an exit aperture,
at least one peripheral converging-diverging oxygen nozzle spaced at a greater radial distance from said central oxygen nozzle than said fuel nozzle and having a central longitudinal axis and an exit aperture,
means for supplying oxygen-containing gas and fuel to said respective nozzles,
said central longitudinal axes of said nozzles being parallel to each other and to a longitudinal axis of said burner, said exit apertures of said central oxygen nozzle and said fuel nozzle positioned in a first plane perpendicular to said central longitudinal axes, and said exit aperture of said peripheral oxygen nozzle positioned in a second plane perpendicular to said central longitudinal axes, and
wherein said chamber is defined by a cylindrical casing including a cooling jacket forming a part of said casing for receiving coolant material and said nozzles are substantially surrounded by said cooling jacket, a rear wall, and a front wall containing said second plane, said peripheral oxygen nozzle and an end of said cooling jacket.

* * * * *

UNITED STATES PATENT AND TRADEMARK OFFICE
CERTIFICATE OF CORRECTION

PATENT NO. : 5,104,310

DATED : April 14, 1992

INVENTOR(S) : Saltin, Lars

It is certified that error appears in the above-identified patent and that said Letters Patent is hereby corrected as shown below:

Col. 7, line 7 delete "aid" and insert therefor --said--

Col. 7, line 8 delete "aid" and insert therefor --said--

Signed and Sealed this

Eighth Day of June, 1993

Attest:

MICHAEL K. KIRK

Attesting Officer

*Acting Commissioner of Patents and Trademarks*